(12) United States Patent
Clark et al.

(10) Patent No.: US 11,319,827 B2
(45) Date of Patent: May 3, 2022

(54) INTERSEGMENT SEAL FOR BLADE OUTER AIR SEAL

(71) Applicant: United Technologies Corporation, Farmington, CT (US)

(72) Inventors: Thomas E. Clark, Sanford, ME (US); William M. Barker, North Andover, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 288 days.

(21) Appl. No.: 16/371,330

(22) Filed: Apr. 1, 2019

(65) Prior Publication Data
US 2020/0308973 A1    Oct. 1, 2020

(51) Int. Cl.
| F01D 11/08 | (2006.01) |
| F01D 11/00 | (2006.01) |
| F16J 15/08 | (2006.01) |
| F01D 25/24 | (2006.01) |

(52) U.S. Cl.
CPC ........... F01D 11/08 (2013.01); F01D 11/005 (2013.01); F01D 25/246 (2013.01); F16J 15/0887 (2013.01); F05D 2240/11 (2013.01); F05D 2240/55 (2013.01); F05D 2250/75 (2013.01); F05D 2300/6033 (2013.01)

(58) Field of Classification Search
CPC ........ F01D 11/05; F01D 11/08; F01D 11/005; F05D 2250/75; F05D 2240/11
See application file for complete search history.

(56) References Cited

U.S. PATENT DOCUMENTS

| 8,585,354 B1* | 11/2013 | Liang .................... F01D 11/008 |
| | | 415/135 |
| 9,759,078 B2 | 9/2017 | Farah et al. |
| 9,926,790 B2* | 3/2018 | Landwehr ............. F01D 11/005 |
| 10,151,209 B2 | 12/2018 | Boecl |
| 10,550,706 B2* | 2/2020 | Lutjen ..................... F01D 11/08 |
| 10,718,226 B2* | 7/2020 | Vetters ................... F01D 25/005 |
| 2003/0021676 A1* | 1/2003 | Tiemann ............... F01D 11/005 |
| | | 415/134 |

(Continued)

FOREIGN PATENT DOCUMENTS

| EP | 2055900 | 5/2009 |
| EP | 3608514 | 2/2020 |

(Continued)

OTHER PUBLICATIONS

Extended EP Search Report for EP Application No. 20166989.2 dated Aug. 31, 2020.

(Continued)

*Primary Examiner* — Topaz L. Elliott
(74) *Attorney, Agent, or Firm* — Carlson, Gaskey & Olds, P.C.

(57) ABSTRACT

A blade outer air seal assembly includes a blade outer air seal segment that has a base portion that extends from a first axial side to a second axial side and from a first circumferential side to a second circumferential side. An intersegment seal is arranged adjacent the first circumferential side. The intersegment seal has a first seal portion and a second seal portion connected by a rib.

17 Claims, 7 Drawing Sheets

(56) References Cited

U.S. PATENT DOCUMENTS

| | | | |
|---|---|---|---|
| 2009/0016873 A1* | 1/2009 | Bridges, Jr. | F01D 9/041 |
| | | | 415/139 |
| 2016/0032747 A1 | 2/2016 | Bez et al. | |
| 2018/0195401 A1* | 7/2018 | Sippel | F01D 11/005 |
| 2019/0040761 A1* | 2/2019 | Carlin | F01D 11/122 |
| 2019/0153886 A1* | 5/2019 | Vetters | F01D 25/246 |
| 2020/0355089 A1* | 11/2020 | Razzell | F01D 11/005 |

FOREIGN PATENT DOCUMENTS

| | | |
|---|---|---|
| EP | 3626934 | 3/2020 |
| GB | 2303888 | 5/1997 |

OTHER PUBLICATIONS

Partial EP Search Report for EP Application No. 20166989.2 dated May 28, 2020.

* cited by examiner

INTERSEGMENT SEAL FOR BLADE OUTER AIR SEAL

BACKGROUND

This application relates to an intersegment seal for a ceramic matrix composite blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

In order to prevent fluid leakage, featherseals may be provided between adjacent components near the core flow path boundary. For example, some known engines include featherseals that span a gap between adjacent blade outer air seals.

SUMMARY

In one exemplary embodiment, a blade outer air seal assembly includes a blade outer air seal segment that has a base portion that extends from a first axial side to a second axial side and from a first circumferential side to a second circumferential side. An intersegment seal is arranged adjacent the first circumferential side. The intersegment seal has a first seal portion and a second seal portion connected by a rib.

In a further embodiment of any of the above, the intersegment seal is formed from a ceramic matrix composite material.

In a further embodiment of any of the above, the rib extends along a length of the first seal portion in an axial direction.

In a further embodiment of any of the above, the first seal portion is generally rectangular and has a length in an axial direction and a width in a circumferential direction.

In a further embodiment of any of the above, the second seal portion has a second length in the axial direction that is smaller than the length of the first seal portion.

In a further embodiment of any of the above, the second seal portion has a second width in the circumferential direction that is about the same as the width of the first seal portion.

In a further embodiment of any of the above, the first seal portion has a thickness and the second seal portion has a second thickness that is about the same as the thickness.

In a further embodiment of any of the above, the second seal portion has a radially extending wall.

In a further embodiment of any of the above, the radially extending wall extends a width of the second seal portion in a circumferential direction.

In a further embodiment of any of the above, the blade outer air seal segment has a circumferentially extending slot at the first circumferential side. At least a portion of the first seal portion is arranged within the circumferentially extending slot.

In a further embodiment of any of the above, the first and second seal portions and the rib form an H shape.

In a further embodiment of any of the above, the second seal portion is arranged adjacent a radially outer surface of the base portion.

In a further embodiment of any of the above, the first and second portions have a thickness between about 0.01 and 0.04 inches (0.254 and 1.016 mm).

In a further embodiment of any of the above, the blade outer air seal segment is a ceramic matrix composite material.

In another exemplary embodiment, a method of forming an intersegment seal comprising the step of forming a sheet formed from a fibrous woven structure into a body that has first and second seal portions connected by a rib. A densification material is injected into the sheet.

In a further embodiment of any of the above, the body has an H shape.

In a further embodiment of any of the above, the method includes machining the second portion and the rib.

In a further embodiment of any of the above, the method includes machining a notch into the rib and bending a portion of the second seal portion to form an axial portion.

In a further embodiment of any of the above, the fibrous woven structure includes silicon carbide fibers.

In a further embodiment of any of the above, the densification material is a silicon carbide matrix.

DETAILED DESCRIPTION

Figure 1:
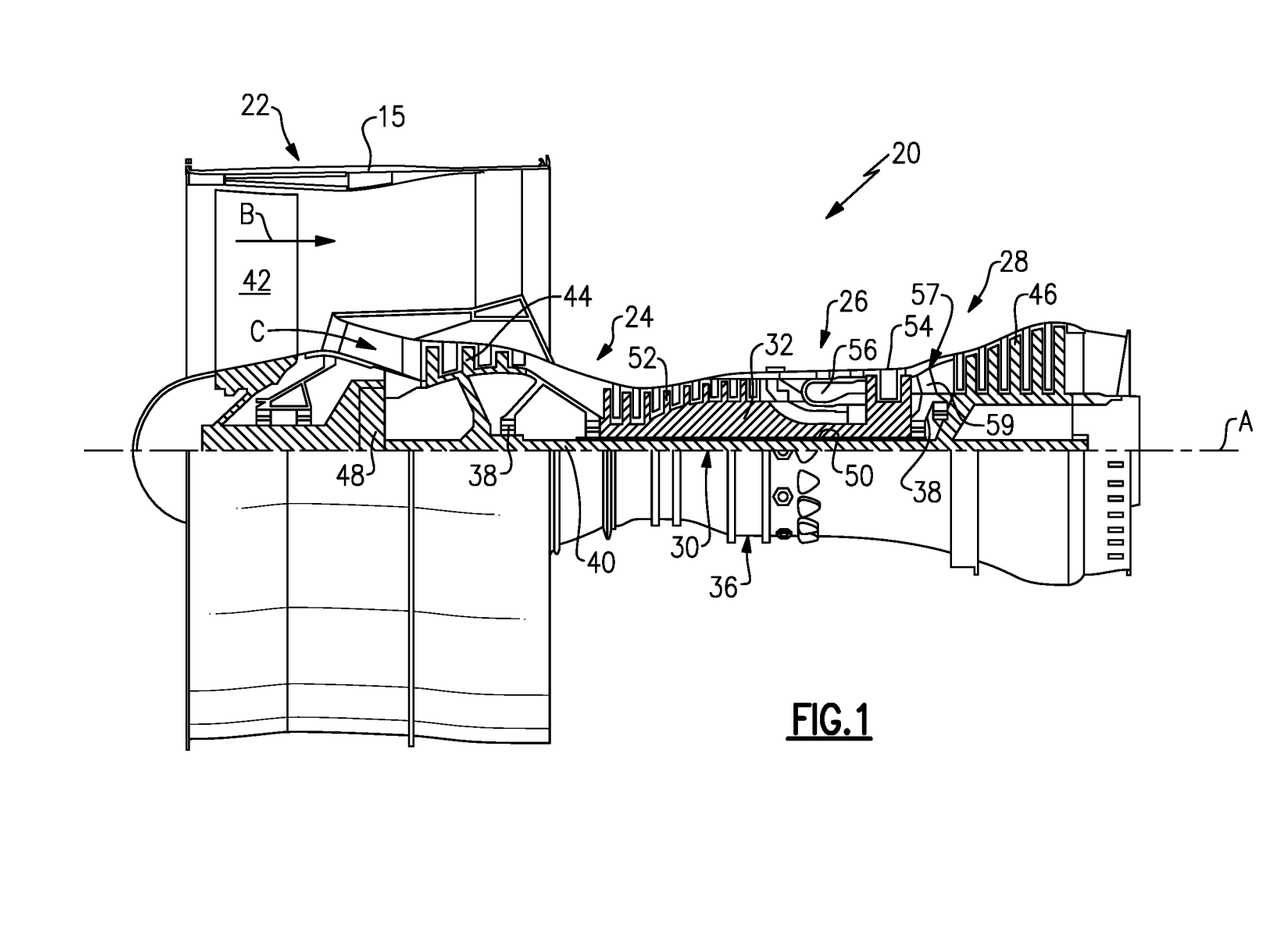
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
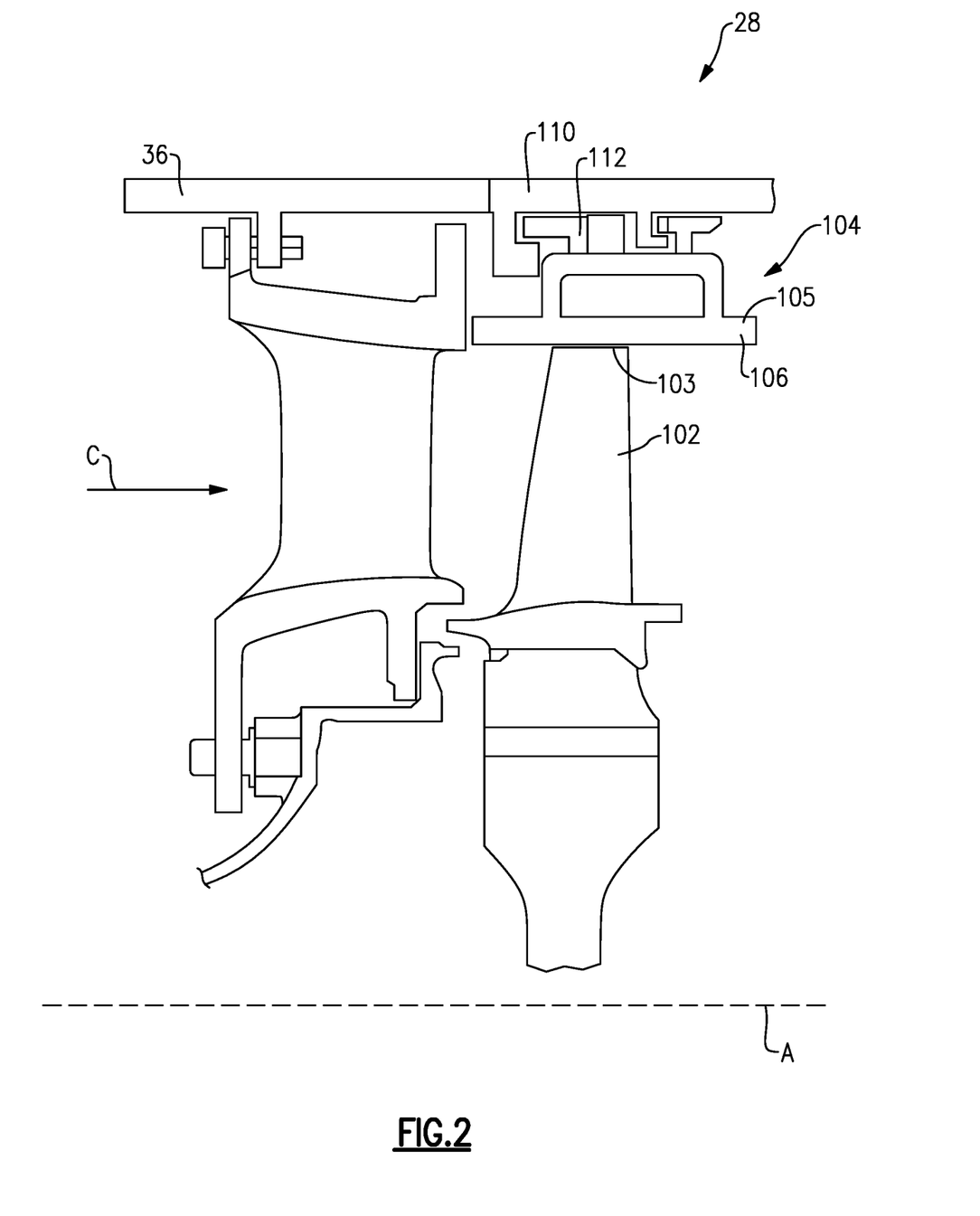
FIG. 2 shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
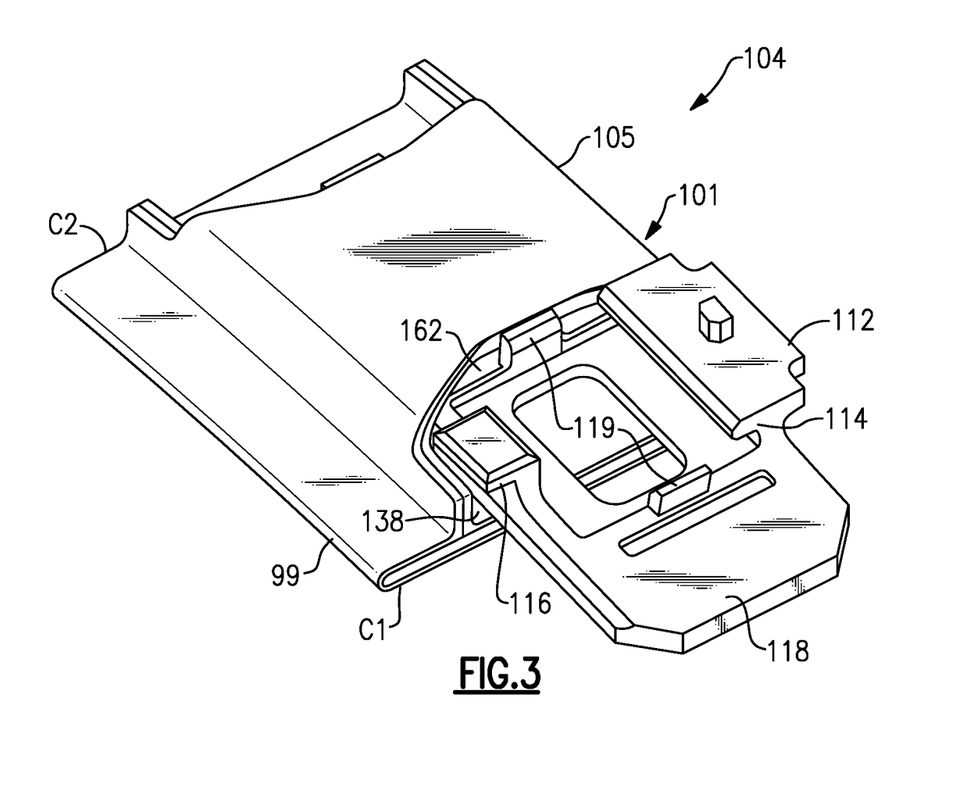
FIG. 3 shows a portion of an exemplary blade outer air seal assembly.

FIG. 3 shows a portion of an example BOAS assembly 104. The assembly 104 has a seal segment 105 with a carrier 112. The carrier 112 may be segmented, with each segment arranged between adjacent seal segments 105. The carrier 112 has a base portion or platform 118 that is configured to engage with the seal segment 105. In this example, an end of the platform 118 fits within a passage 138 of the seal segment 105. The carrier 112 has first and second hooks 114, 116 that extend radially outward from the platform 118 for attaching the carrier 112 and seal segment 105 to the support structure 110. The carrier 112 may have posts 119 that engage with an edge of the seal segment 105, and help prevent rotation of the seal segment 105 relative to the carrier 112.

Figure 4:
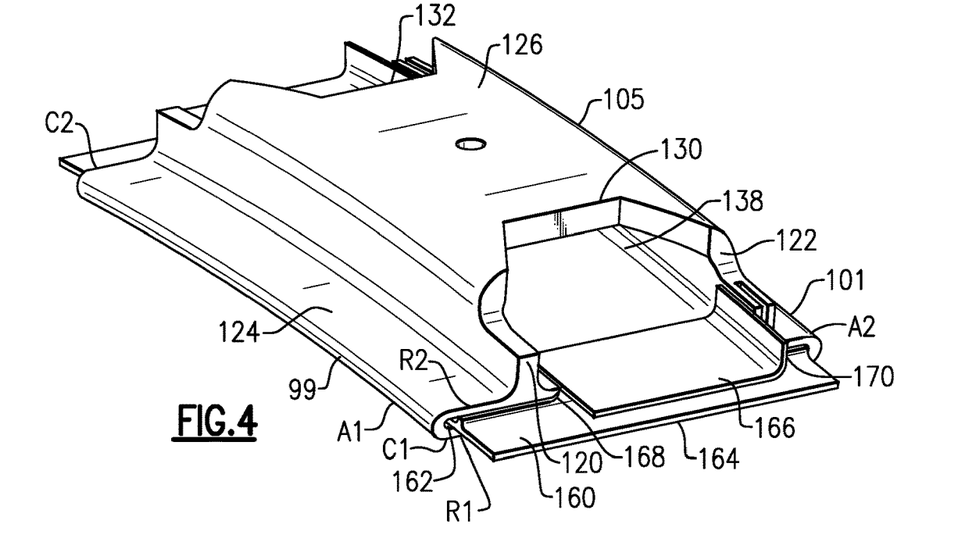
FIG. 4 shows a portion of an exemplary blade outer air seal assembly.

FIG. 4 shows an example BOAS segment 105. The seal segment 105 is a body that defines radially inner and outer sides R1, R2, respectively, first and second axial sides A1, A2, respectively, and first and second circumferential sides C1, C2, respectively. The first and second circumferential sides C1, C2 form matefaces that are configured to engage with the circumferential sides of an adjacent BOAS segment 105. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end). That is, the first axial side A1 corresponds to a leading edge 99, and the second axial side A2 corresponds to a trailing edge 101.

In the illustrated example, the BOAS segment 105 includes a first axial wall 120 and a second axial wall 122 that extend radially outward from a base portion 124. The first and second axial walls 120, 122 are axially spaced from one another. Each of the first and second axial walls 120, 122 extends along the base portion 124 in a generally circumferential direction along at least a portion of the seal segment 105. The base portion 124 extends between the leading edge 99 and the trailing edge 101 and defines a gas path on a radially inner side and a non-gas path on a radially outer side. An outer wall 126 extends between the first and second axial walls 120, 122. The outer wall 126 includes a generally constant thickness and constant position in the radial direction. The base portion 124, first and second axial walls 120, 122, and the outer wall 126 form a passage 138 that extends in a generally circumferential direction. In this disclosure, forward, aft, upstream, downstream, axial, radial, or circumferential is in relation to the engine axis A unless stated otherwise. The base portion 124 may extend axially forward and aft of the first and second walls 120, 122, and provides a surface for sealing of the BOAS leading and trailing edges 99, 101. For example, the base portion 124 includes a portion axially forward of the first axial wall 120 for engagement with seals. The outer wall 126 has first and second edges 130, 132. The edges 130, 132 help prevent rotation of the seal segment 105 relative to the carrier 112.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. The fibers may be coated by a boron nitride. In other examples, the BOAS 106 may be made of a monolithic ceramic.

CMC components such as BOAS segments 105 are formed by laying fiber material, such as laminate sheets, in tooling, injecting a liquid resin into the tooling, and curing to form a solid composite component. The component may be densified by adding additional material to further stiffen the laminates. Although a loop BOAS segment 105 is illustrated, other BOAS arrangements may fall within the scope of this disclosure. Although a CMC BOAS segment 105 is described, other BOAS materials may fall within the scope of this disclosure.

Figure 5:
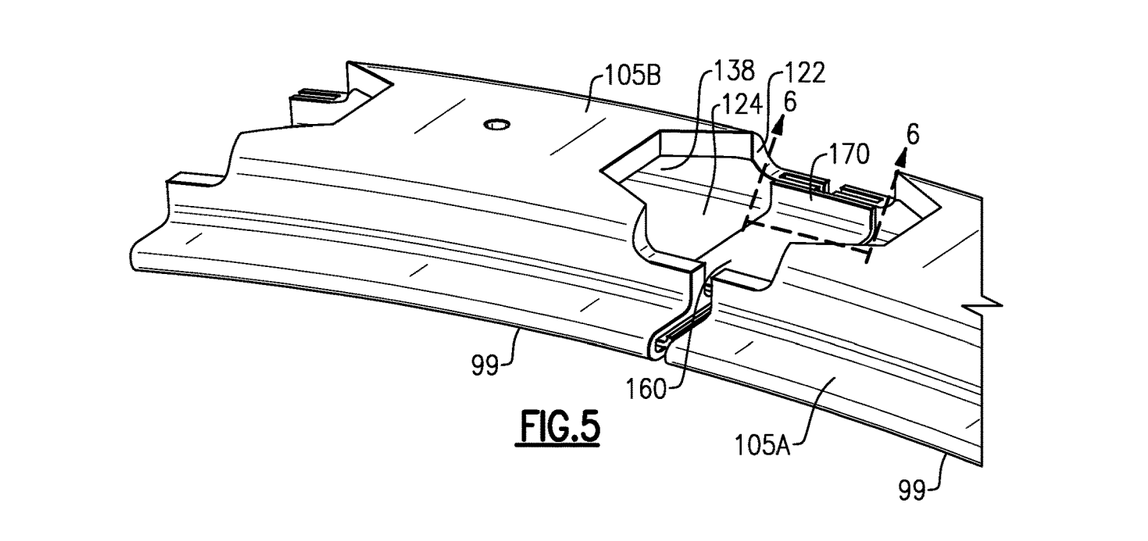
FIG. 5 shows a portion of an exemplary blade outer air seal assembly.

As shown in FIG. 5, and with continuing reference to FIG. 4, a feather seal or intersegment seal 160 is arranged at each of the first and second circumferential sides C1, C2. The intersegment seal 160 is configured to span between two adjacent seal segments 105A, 105B. The intersegment seal 160 generally has a first seal portion 164 that is radially inward of a second seal portion 166. The first and second seal portions 164, 166 extend circumferentially and are joined by a radially extending rib 168. In some embodiments, the BOAS segment 105 has a slot 162 that extends along the circumferential sides C1, C2 to receive the intersegment seal 160. The first seal portion 164 is received within the slot 162. The second seal portion 166 is arranged adjacent the second radial side R2 of the BOAS segment 105. The first seal portion 164 extends along the first circumferential side C1 beyond the first and second walls 120, 122 in the axial direction.

In some examples, the intersegment seal 160 has a radial portion 170 that extends radially outward from the second seal portion 166. The radial portion 170 is generally arranged adjacent the second wall 122.

Figure 6:
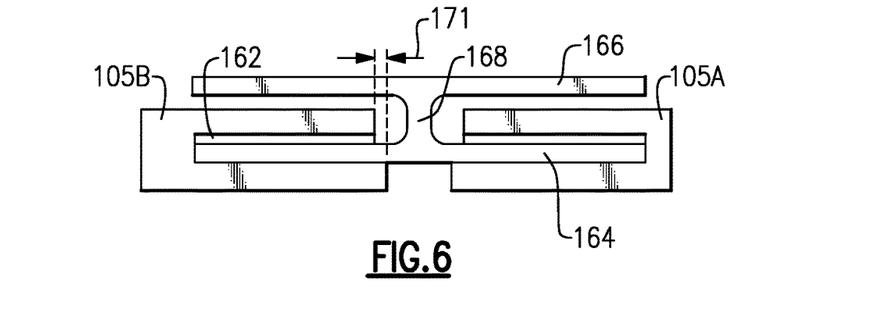
FIG. 6 shows a cross-sectional view along line 6-6 of the blade outer air seal assembly of FIG. 5.

FIG. 6 is a cross sectional view along line 6-6 of FIG. 5. The first and second seal portions 164, 166 and the rib 168 generally form an "H" shape. The first seal portion 164 provides a primary sealing surface by contacting a surface of the slot 162. Thus, a seal is formed between the BOAS segment 105 and the intersegment seal 160. The second seal portion 166 retains the intersegment seal 160 in position in the radial direction, and prevents the intersegment seal 160 from falling into the gaspath. The second seal portion 166 provides a secondary sealing surface. In the event of a catastrophic failure of the intersegment seal 160, the second seal portion 166 will contact the second radial surface R2. The second seal portion 166 may provide secondary retention if the intersegment seal 160 structurally fails or erodes over time.

The slot 162 in the BOAS segment 105 is formed between the first and second radial surfaces R1, R2. In some embodiments, an upper portion of the base portion 124 between the slot 162 and the second radial surface R2 is shorter in the circumferential direction by a distance 171. This distance 171 acts as a relief cut, and accommodates axial closure of the mateface between BOAS segments 105A, 105B.

Figure 7A:
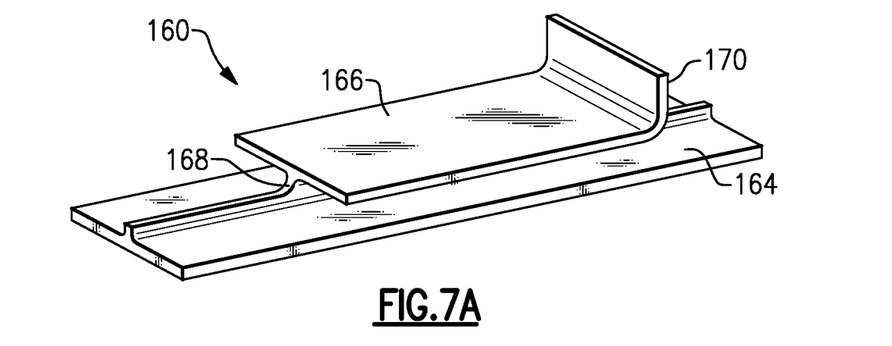
FIG. 7A shows an exemplary intersegment seal.

FIG. 7A is an example intersegment seal 160. The first and second seal portions 164, 166 form a gap between them on either side of the rib 168 for engagement with a BOAS seal segment 105. The radial portion 170 provides an axial face to abut the second wall 122. The radial portion 170 may help prevent the intersegment seal 160 from sliding relative to the BOAS segment 105 and may provide additional sealing.

Figure 7B:
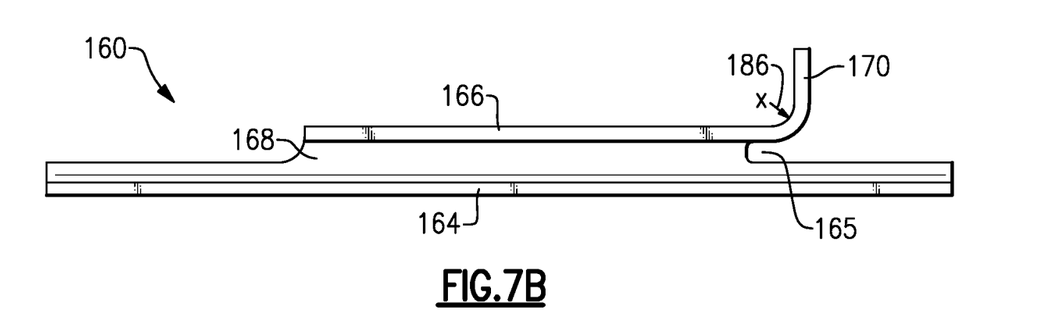
FIG. 7B shows a side view of the exemplary intersegment seal of FIG. 7A.

As shown in FIG. 7B, the radial portion 170 extends in a direction substantially perpendicular to the second seal portion 166. The first seal portion 164 extends axially forward and aft of the second seal portion 166. The radial portion 170 is arranged at an aft end of the second seal portion 166. The radial portion 170 helps stiffen the intersegment seal 160 in the circumferential direction. In an example, the radial portion 170 is bent to extend in the radial direction, and has a radius 186 where the radial portion 170 meets the second seal portion 166. A notch 165 may extend into the rib 168 to facilitate formation of the radial portion 170.

Figure 7C:
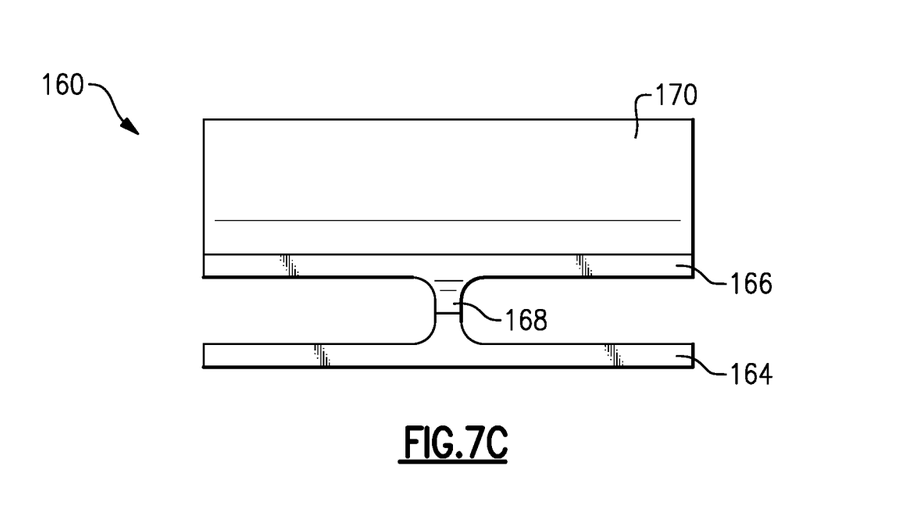
FIG. 7C shows a front view of the exemplary intersegment seal of FIG. 7A.

As can be seen in FIG. 7C, the first and second seal portions 164, 166 extend the same distance in the circumferential direction. The rib 168 is centered between the first and second seal portions 164, 166 in the circumferential direction. The first and second seal portions 164, 166 are substantially parallel to one another in the circumferential and axial directions. Although the first and second seal portions 164, 166 are shown having the same circumferential width, in other embodiments, the first and second seal portions 164, 166 may have different widths.

Figure 8A:
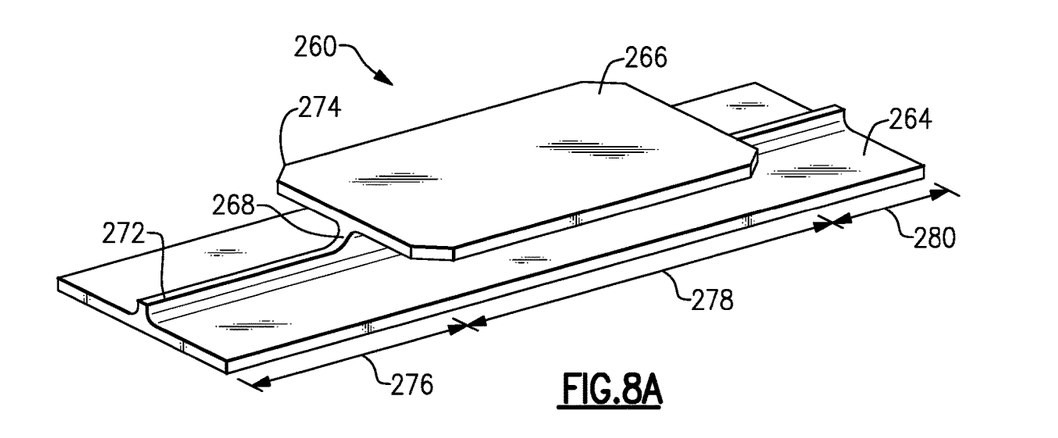
FIG. 8A shown another exemplary intersegment seal.
Figure 8B:
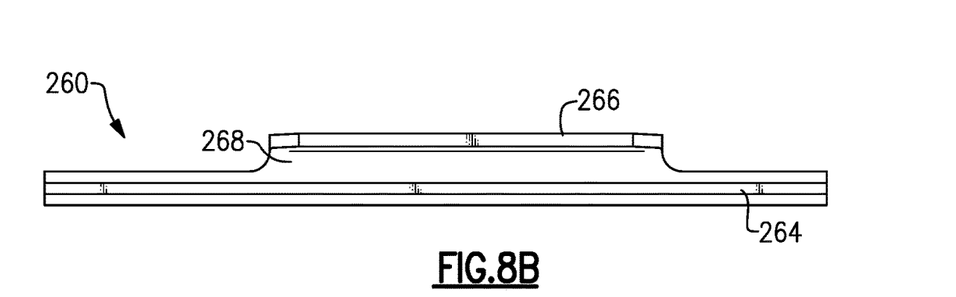
FIG. 8B shows a side view of the exemplary intersegment seal of FIG. 8A.
Figure 8C:
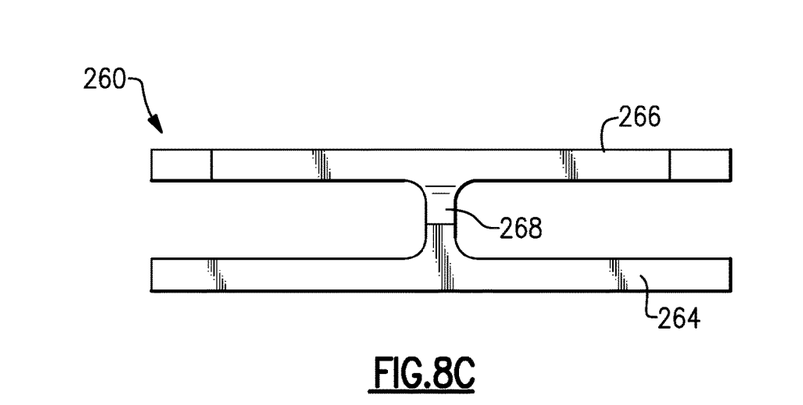
FIG. 8C shows a front view of the exemplary intersegment seal of FIG. 8A.

FIGS. 8A-C illustrate another example intersegment seal 260. In this example, the second seal portion 266 is flat. This example intersegment seal 260 may be easy to manufacture, for example. In some examples, the second seal portion 266 has chamfers 274 at the corners to help facilitate assembly.

As can be seen in FIG. 8A, the second seal portion 266 has a length 278 in the axial direction. The first seal portion 264 extends beyond the second seal portion 266 a distance 276 axially forward, and a distance 280 axially backwards. In some examples, the distance 276 is about equal to the distance 280. That is, the second seal portion 266 is centered on the first seal portion 264 in the axial direction. In other examples, the second seal portion 266 is shifted axially forward or aft relative to the first seal portion 264, making the distance 276 larger or smaller than the distance 280. The distances 276, 280, and the width 278 are selected to accommodate the particular BOAS segment 105. In this example, the width 278 generally corresponds to the distance between the first and second walls 120, 122 of the BOAS segment 105.

As can be seen in FIG. 8C, the first and second portions 264, 266 and the rib 268 have the same thickness. The first and second portions 264, 266 may have about the same width in the circumferential direction. However, in some embodiments, the first and second portions 264, 266 have different widths in the circumferential direction. In one example, the height of the rib 268 in the radial direction is smaller than the width or length of the first and second seal portions 264, 266 in the circumferential or axial directions.

Figure 9:
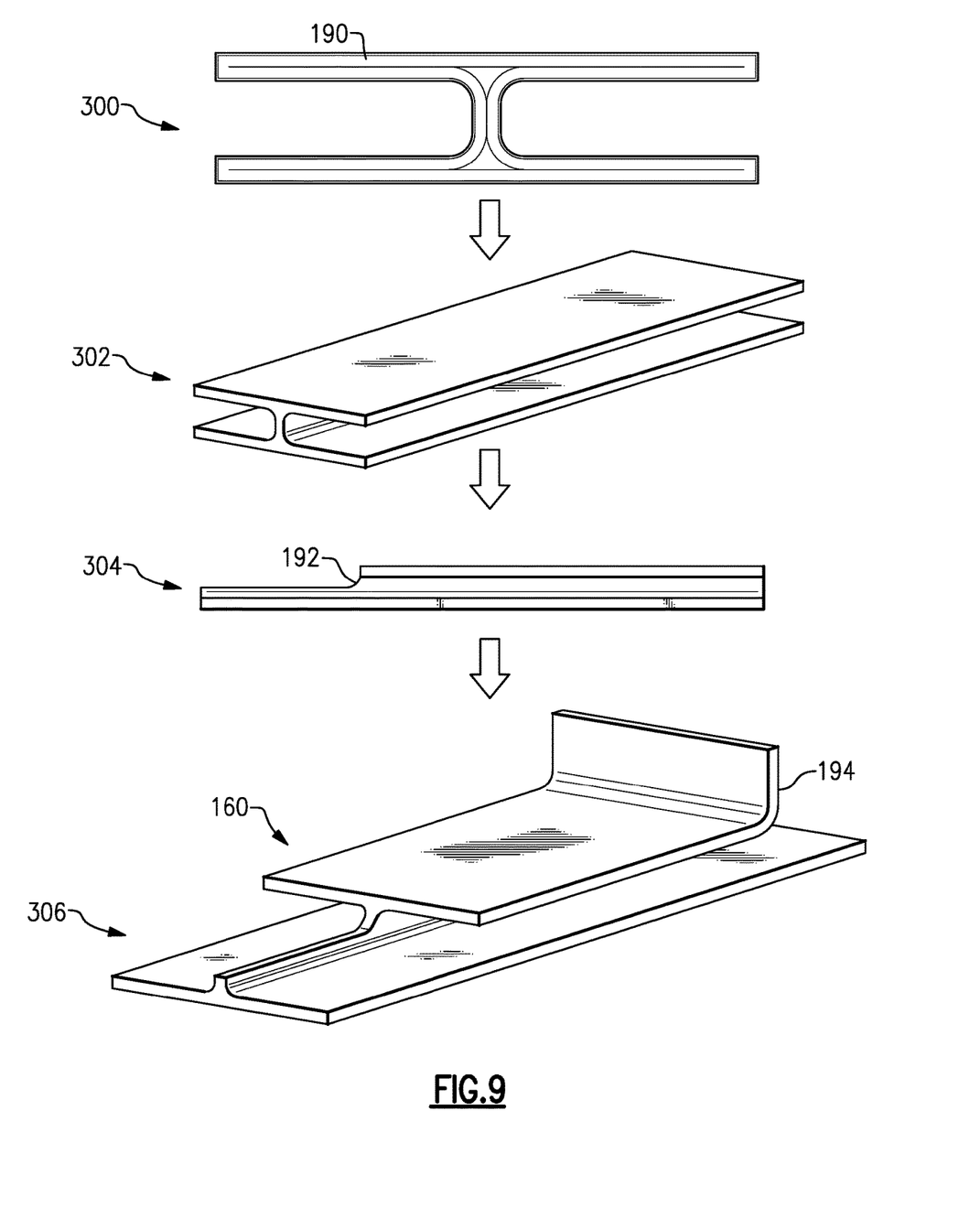
FIG. 9 summarizes an example method of forming an intersegment seal.

FIG. 9 summarizes an example method of forming the intersegment seal 160, 260. First, a body of the seal 160 is formed from a laminate ply 190 at 300, 302. The laminate ply 190 may comprise one or multiple layers of 8-Harness-Satin weave ("8HS") or braid to produce the "H" shaped body. In one example, the intersegment seal 160 is formed from a silicon carbide matrix composite. The intersegment seal 160 may be formed from an 8HS laminate. In an embodiment, the intersegment seal 160 is formed from a ceramic material. In another embodiment, the intersegment seal 160 is formed from another material, such as a polymer material. The intersegment seal 160 may be formed from 1-4 plies. In an embodiment, each ply has a thickness between about 0.01 inches and 0.04 inches (0.254-1.016 mm). In some examples, the first and second portions 164, 166 and the rib 168 have the same thickness. the first and second portions 164, 166 and the rib 168 may have a thickness between about 0.010 inches and about 0.160 inches (0.254-4.064 mm), for example.

Next, material is trimmed from an axially forward portion 192 at 304. This enables the intersegment seal 160 to accommodate the structure of the BOAS segment 105. In the disclosed example arrangement, the axially forward portion 192 is trimmed to permit the second seal portion 166 to fit axially between the first and second walls 120, 122, while the first seal portion 164 extends for more of the mateface in the axial direction. In some embodiments, material may be trimmed from an axially aft portion of the seal body.

Next, in some embodiments, the radial portion 170 is formed by bending the portion 194 at 306. In some examples, a notch is formed in the rib 168 before the radial portion 170 is bent to form the radial portion 170.

Once the final intersegment seal shape is formed, the component may be stiffened through densification. Densification makes the laminates stiffer than their free woven fiber state by adding additional material to increase the density of the laminate material after assembly. Additional material, such as a silicon carbide matrix material is injected into spaces between the fibers in the woven layers. This may be utilized to provide 100% of the desired densification, or only some percentage. One hundred percent densification may be defined as the layers being completely saturated with the matrix and about the fibers. One hundred percent densification may be defined as the theoretical upper limit of layers being completely saturated with the matrix and about the fibers, such that no additional material may be deposited. In practice, 100% densification may be difficult to achieve. In some embodiments, the intersegment seal 160, 260 may be densified before machining additional features, such as the portion 192.

In some embodiments, the intersegment seal 160, 260 may have a seal coating and/or environmental barrier coating (EBC) along all or a portion of the intersegment seal 160, 260. For example, the intersegment seal 160, 260 may have an EBC along the gaspath surface, or radial innermost-portion, of the intersegment seal 160, 260.

Known feather seals are typically formed from metallic alloys, and are thus temperature limited. Known CMC BOAS arrangements can have larger gaps between segments than metallic BOAS, because of the relative thermal growth between the BOAS segment and the carrier. The larger gap between segments exposes more of the intersegment seal to the hot gases from the gaspath. The disclosed intersegment seal 160, 260 is formed from CMC, which can be exposed to higher temperatures than metallic components. The disclosed intersegment seal 160, 260 arrangement further provides secondary retention to ensure durable survival.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a blade outer air seal segment having a base portion extending from a first axial side to a second axial side and from a first circumferential side to a second circumferential side; and
   an intersegment seal arranged adjacent the first circumferential side, the intersegment seal having a first seal portion and a second seal portion connected by a rib, the rib extends along a length of the first seal portion in an axial direction, wherein the first and second seal portions and the rib form an H shape in a plane extending in the circumferential direction; and
   wherein the blade outer air seal segment has a circumferentially extending slot at the first circumferential side, and at least a portion of the first seal portion is arranged within the circumferentially extending slot.

2. The blade outer air seal assembly of claim 1, wherein the intersegment seal is formed from a ceramic matrix composite material.

3. The blade outer air seal assembly of claim 1, wherein the first seal portion is generally rectangular having a first length in the axial direction and a first width in the circumferential direction.

4. The blade outer air seal assembly of claim 3, wherein the second seal portion has a second length in the axial direction that is smaller than the first length of the first seal portion.

5. The blade outer air seal assembly of claim 3, wherein the second seal portion has a second width in the circumferential direction that is the same as the first width of the first seal portion.

6. The blade outer air seal assembly of claim 1, wherein the first seal portion has a first thickness and the second seal portion has a second thickness that is the same as the first thickness.

7. The blade outer air seal assembly of claim 1, wherein the second seal portion has a radially extending wall.

8. The blade outer air seal assembly of claim 7, wherein the radially extending wall extends a width of the second seal portion in the circumferential direction.

9. The blade outer air seal assembly of claim 7, wherein the radially extending wall is at an aft end of the second seal portion.

10. The blade outer air seal assembly of claim 1, wherein the second seal portion is arranged adjacent a radially outer surface of the base portion.

11. The blade outer air seal assembly of claim 10, wherein the second seal portion is arranged radially outward of the radially outer surface of the base portion.

12. The blade outer air seal assembly of claim 1, wherein the first and second portions have a thickness between 0.01 and 0.04 inches (0.254 and 1.016 mm).

13. The blade outer air seal assembly of claim 1, wherein the blade outer air seal segment is a ceramic matrix composite material.

14. The blade outer air seal assembly of claim 1, wherein the first seal portion extends axially beyond the second seal portion.

15. The blade outer air seal assembly of claim 1, wherein the second seal portion has a chamfer.

16. The blade outer air seal assembly of claim 1, wherein the first and second seal portions extend circumferentially outward of the rib.

17. The blade outer air seal assembly of claim 1, wherein the blade outer air seal segment has a first axial wall axially spaced from a second axial wall, the first and second axial walls extending from the base portion, and an outer wall extends between the first and second axial walls.

* * * * *